United States Patent
Schenk et al.

(12)

(10) Patent No.: US 9,680,360 B2
(45) Date of Patent: Jun. 13, 2017

(54) METHOD FOR PRODUCING A COATED COMPONENT OF TRANSPARENT OR OPAQUE FUSED SILICA

(71) Applicant: Heraeus Quarzglas GmbH & Co. KG, Hanau (DE)

(72) Inventors: Christian Schenk, Ingelheim (DE); Gerrit Scheich, Seligenstadt (DE); Nils-Christian Nielsen, Schlangenbad (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/543,718

(22) Filed: Nov. 17, 2014

(65) Prior Publication Data
US 2015/0143848 A1    May 28, 2015

(30) Foreign Application Priority Data

Nov. 28, 2013 (EP) ..................... 13194963

(51) Int. Cl.
| | | |
|---|---|---|
| C03C 17/04 | (2006.01) |
| H02K 17/26 | (2006.01) |
| C03B 20/00 | (2006.01) |
| C03C 3/06 | (2006.01) |
| H02K 3/28 | (2006.01) |
| H02K 5/22 | (2006.01) |
| H02K 11/00 | (2016.01) |
| H02K 17/22 | (2006.01) |
| H02K 11/20 | (2016.01) |

(52) U.S. Cl.
CPC ............. *H02K 17/26* (2013.01); *C03B 20/00* (2013.01); *C03C 3/06* (2013.01); *C03C 17/04* (2013.01); *H02K 3/28* (2013.01); *H02K 5/225* (2013.01); *H02K 11/0094* (2013.01); *H02K 11/20* (2016.01); *H02K 17/22* (2013.01); *C03C 2217/213* (2013.01); *C03C 2218/11* (2013.01)

(58) Field of Classification Search
CPC ..................................................... C03C 17/04
See application file for complete search history.

(56) References Cited

U.S. PATENT DOCUMENTS

| | | | | |
|---|---|---|---|---|
| 3,480,460 A | * | 11/1969 | Breton ....................... | C03C 4/00 427/198 |
| 6,012,304 A | * | 1/2000 | Loxley .................... | C03B 19/06 264/653 |
| 8,158,542 B2 | | 4/2012 | Werdecker et al. | |
| 8,209,998 B2 | | 7/2012 | Werdecker et al. | |
| 8,347,650 B2 | | 1/2013 | Lehmann et al. | |
| 2009/0266110 A1 | | 10/2009 | Werdecker et al. | |
| 2009/0320521 A1 | | 12/2009 | Lehmann et al. | |
| 2012/0114847 A1 | | 5/2012 | Werdecker et al. | |
| 2012/0237685 A1 | | 9/2012 | Werdecker et al. | |

FOREIGN PATENT DOCUMENTS

| | | |
|---|---|---|
| DE | 10 2004 051 846 A1 | 3/2006 |
| DE | 10 2006 032 687 A1 | 1/2008 |
| DE | 10 2006 046 619 A1 | 4/2008 |
| DE | 10 2008 030 310 B3 | 6/2009 |
| WO | 2011 042262 A2 | 4/2011 |

OTHER PUBLICATIONS

Espacenet English Language Abstract of DE 10 2008 030 310 B3, published Jun. 18, 2006.
Espacenet English Language Abstract of DE 10 2004 051 846, Mar. 2, 2006.
Espacenet English Language Abstract of DE 10 2006 046 619, published Apr. 3, 2008.
Espacenet English Language Abstract of WO 2011 042 262 A2, published Apr. 14, 2011.

* cited by examiner

*Primary Examiner* — Cynthia Szewczyk
(74) *Attorney, Agent, or Firm* — Tiajoloff & Kelly LLP

(57) ABSTRACT

A method for producing a coated component consisting of transparent or opaque fused silica comprises a method step in which a $SiO_2$ granulation layer is applied to a coating surface of a substrate, which in the area of the free surface has a relatively great granulation fine fraction. Starting from this, in order to achieve a smooth, preferably also dense surface layer, it is suggested according to the invention that the application of the $SiO_2$ granulation layer comprises (i) providing a dispersion containing a dispersion liquid and amorphous $SiO_2$ particles which form a coarse fraction with particle sizes ranging between 1 µm and 50 µm and a fine fraction of $SiO_2$ nanoparticles having particle sizes of less than 100 nm, wherein the solids content of the dispersion is between 70 and 80 wt.-%, and of which between 2 wt.-% and 15 wt.-% are the $SiO_2$ nanoparticles, (ii) applying the dispersion to the coating surface by casting or spraying it thereonto so as to form a slurry layer having a layer thickness of at least 0.3 mm; and (iii) drying the slurry layer by removing the dispersion liquid at a rate and in a direction such that under the action of the dispersion liquid being removed the fine fraction is enriched in the outer portion of the granulation layer, thereby forming a casting skin.

15 Claims, 3 Drawing Sheets

METHOD FOR PRODUCING A COATED COMPONENT OF TRANSPARENT OR OPAQUE FUSED SILICA

TECHNICAL FIELD

The present invention refers to a method for producing a coated component consisting of transparent or opaque fused silica, the method comprising the following steps:
a) providing a substrate of transparent or of opaque fused silica which comprises a coating surface;
b) applying a $SiO_2$ granulation layer to the coating surface, which granulation layer has an inner portion adjoining the coating surface and having a first granulation fine fraction, and an outer portion adjoining the free surface of the granulation layer and having a second granulation fine fraction, the second granulation fine fraction being higher than the first granulation fine fraction;
(c) sintering the granulation layer so as to form a $SiO_2$ surface layer.

Components of undoped or doped transparent fused silica or of opaque fused silica are used in many applications which require high chemical and thermal resistance or optical transparence. The term "quartz glass" is used hereinafter as a general term also for opaque fused silica. The following examples are here given: cladding tubes, bulbs, covering plates, reflector substrates for optics, reactors, apparatus or crucibles of quartz glass in chemical process engineering and apparatus building, carrier trays, jars, crucibles or protective shields in semiconductor manufacture.

To optimize the mechanical, optical or chemical surface characteristics, a previously produced quartz glass component may be provided fully or in part with a functional layer adapted to the specific intended use. Known surface modifications comprise coating with a material having an increased softening temperature for improving the temperature stability or chemical resistance, or coating with high-purity material for reducing the risk of contamination posed by the component.

PRIOR ART

In applications where the quartz glass component is exposed to high thermal loads and chemically aggressive environments, great importance is often attached to a smooth and defect-free surface. The reason is that dense surface layers with hardly any bubbles improve the etching and corrosion resistance.

For instance, the wall of crucibles of opaque fused silica for producing silicon or the inner wall of an opaque quartz glass crucible, as is used for pulling single crystals according to the so-called Czochralski method, in contact with the silicon melt is subjected to high mechanical, chemical and thermal loads. Therefore, to reduce the corrosive attack of the silicon melt and to minimize the accompanying release of impurities from the crucible wall, an inner layer of dense and transparent quartz glass is produced on the otherwise opaque wall.

In the simplest case the surface is smoothed and densified by "fire polishing". The porous wall is here locally heated by way of a plasma or oxyhydrogen flame to high temperatures in the range of 1650° C. to 2200° C., so that the opaque porous base material is converted in a near-surface region into transparent quartz glass. However, it has been found that only very thin transparent layers are achievable in this way. The reason is that the vitrified transparent surface layer acts as a heat insulator which makes it difficult to adequately heat the underlying portions that are still opaque. It often happens that processing with a rather high flame temperature results in plastic deformation and evaporation of gaseous silicon monoxide (SiO).

Dense sintering can be facilitated by providing the near-surface component portions to be thermally densified with a lower viscosity or a higher sintering activity. This proposal is e.g. made in DE 10 2008 030 310 A1, which also discloses a method of the aforementioned type. A quartz glass crucible is here built up of several layers of $SiO_2$ granules, with the mean particle size thereof decreasing successively. A layer of synthetically produced quartz glass granules with a particle size in the range of 50 µm to 120 µm is first formed on a crucible-like granulation layer of mechanically consolidated coarse-grained quartz sand, and an innermost $SiO_2$ granulation layer of spherical, synthetically produced, fine $SiO_2$ particles with a mean particle size of around 15 µm is formed thereon in turn. The granulation layers are subsequently sintered from the inside to the outside by means of an electric arc, wherein the finely divided quartz glass powder of the innermost granulation layer is first melting and a dense glass layer is thereby formed. Its high sintering activity has the effect that one can obtain a sufficiently thick and particularly uniform vitreous inner layer without local inhomogeneities and bubbles at a comparatively low temperature and with a short heating duration.

The production of the transparent inner layer is however complicated, for it requires multiple coating steps with different $SiO_2$ granules that differ in their properties and layer formation characteristics. For instance, the high sintering activity of the synthetic $SiO_2$ granulation of the innermost layer is due to its small particle size and high specific surface area. On the other hand, however, these characteristics make a handling more difficult under standard process conditions. For instance, the finely-divided granules may be easily blown away under the action of the arc pressure and by gas streams and thermal convection, which makes it difficult to produce a granulation layer of a uniform thickness.

This drawback is per se avoided in the production of the layers by means of standard slurry casting methods in which the finely divided $SiO_2$ powder is absorbed in a dispersion liquid and can thereby be handled more easily.

For instance, DE 2004 051 846 A1 describes the production of a quartz glass component provided with a reflector layer, wherein the reflector layer also consists of quartz glass and is produced by means of a slurry casting method. A highly filled, castable, aqueous slurry is produced that contains the amorphous $SiO_2$ particles. The amorphous $SiO_2$ particles are produced by wet milling $SiO_2$ granules and have a mean particle size in the range of 1 µm to 50 µm. On the surface of a quartz-glass base body that is to be coated, a layer of the slurry is applied by spraying, electrostatically supported spraying, flow coating, spinning, dip coating or dispersion coating. The slurry layer is dried into a green layer and subsequently sintered into the reflector layer consisting of opaque quartz glass.

In a modification of this method according to DE 10 2006 046 619 A1 the flow behavior of the $SiO_2$ slurry is modified by adding $SiO_2$ nanoparticles to achieve improved spreadability. In the case of a weight fraction of the $SiO_2$ nanoparticles in the total solids content in the range of 0.2 wt.-% to 15 wt.-% (% by weight), a rather structurally viscous-thixotropic flow behavior of the $SiO_2$ slurry is achieved, which counteracts the flowing off from arched surfaces.

A similar route is also chosen in WO 2011/042262 A2. For the reproducible production of a surface layer of quartz glass on a base body by simply spraying a slurry layer thereon, a composite slurry is suggested that contains splintery $SiO_2$ granules, amorphous, spherical $SiO_2$ particles, $SiO_2$ nanoparticles and a non-ionic alkali-free surfactant. The higher the amount of spherical particles is, the higher can the solids density in the slurry layer be set, which counteracts the generation of stresses during drying and sintering. Sprayability, however, requires a relative low solids content between 74 to 78 wt.-% The surfactant reduces surface tension, thereby increasing the viscosity of the slurry at low shear stresses.

S. M. Olhero et al., "Particle Segregation phenomena occurring during the slip casting process", CERAMICS INTERNATIONAL, Vol. 28, No. 4, 1. January 2002, 377-386 address the phenomenon of segregation of slip-cast parts produced using a slurry containing a $SiO_2$ particles, including $SiO_2$ nanoparticles with a weight fraction from 5 to −15 wt.-%. Segregation is generally perceived as detrimental as it leads to mechanically weak green bodies. It is reported that segregation results from two mechanisms, one of which is gravity and the other is called "clogging the cake", which relates to a clogging-tendency of $SiO_2$ nanoparticles. Which of the mechanisms predominates depends on many factors, especially on the solids content—this varies between. 40 and 50 vol.-% (% by volume)—and the particle size distribution in the slurry.

DE 10 2006 032 687 A1 describes a pressure casting process for the production of pellets made of technical ceramics. A slurry is used which contains particles of the ceramic material having a size is in the range of 10 to 30 microns. In addition the slurry contains nanoparticles from the same technical ceramics, said nanoparticles have a size between 50 and 300 nm. During the pressure casting process the nanoparticles are transported to surface of the molded article where they are accumulated. Thus, the molded article shows increased density near its surface, so that water being pressed in direction of the molded article during demolding cannot penetrate into the surface. Thus, damage to the green body is avoided.

Depending on the application technique and surface property of the coating surface of the component, porous surfaces may however be obtained after sintering, especially in cases where the coating surface itself is already porous. To achieve a sufficiently thick transparent vitrified layer and a dense layer, one needs high sintering temperatures that tend to yield a rough rugged surface.

OBJECT OF THE INVENTION

However, the increasing of the sintering activity of the slurry layers produced thereby by way of loading the slurry with $SiO_2$ nanoparticles to an even greater extent has its limits. The flow characteristics of the slurry are here changing in an inadmissible manner. Moreover, at high contents of $SiO_2$ nanoparticles more and more shrinkage cracks are created due to increased shrinkage during drying and sintering.

Therefore, the application of a plurality of slurry layers for successively producing more and more sinter-active granulation layers in conformity with the above-described production method also requires more or less the same efforts.

On the other hand, the slurry casting method, particularly the spraying on of the slurry layer, permits a comparatively inexpensive production of layers. Sprayed-on slurry layers are moreover distinguished by a particularly homogeneous distribution of the particle sizes over the layer thickness. It is therefore desirable to minimize the drawbacks thereof in the production of dense layers on quartz glass.

As a rule, a slurry layer that is as defect-free as possible is desired. One criterion is that the layer does not flow away under the action of gravitation. This property of the slurry layer is called "carrying capacity" in practice; one says the "layer carries". A slurry to be processed by spraying-on must be thin. Nevertheless, to give the liquid slurry layer its carrying capacity, the layer thickness must be made comparatively small.

It is therefore the object of the present invention to indicate a method for producing a smooth dense surface layer on the coating surface of a quartz glass component that can be produced at comparatively low costs and in a reproducible manner in the case of layer thicknesses of more than 100 μm; especially in cases where the coating surface itself is porous.

General Description of the Invention

This object, starting from the aforementioned method, is achieved according to the invention in that the application of the $SiO_2$ granulation layer according to method step (b) comprises:

(I) providing a dispersion containing a dispersion liquid and amorphous $SiO_2$ particles which form a coarse fraction with particle sizes ranging between 1 μm and 50 μm and a fine fraction of $SiO_2$ nanoparticles having particle sizes of less than 100 nm, wherein the solids content of the dispersion is between 70 and 80 wt.-%, of which between 2 wt.-% and 15 wt.-% are the $SiO_2$ nanoparticles, (II) applying the dispersion to the coating surface by casting or spraying it thereto so as to form a slurry layer with a layer thickness of at least 0.3 mm; and (III) drying the slurry layer by removing the dispersion liquid at a rate and in a direction such that under the action of the dispersion liquid being removed the fine fraction is enriched in the outer portion of the granulation layer, thereby forming a casting skin.

The dried slurry layer is also called "green layer" hereinafter. It constitutes a "granulation layer" within the meaning of the invention, which layer requires thermal densification by sintering so as to form a dense surface layer. The sintering capacity strongly depends on the composition of the slurry layer in the near-surface region. The amount of $SiO_2$ nanoparticles is here decisive. A high amount leads to an increased sintering activity which permits a thermal densification at a comparatively low temperature or with a short sintering duration into a glass of a higher density and lower porosity. Ideally, only relatively fine $SiO_2$ particles are found in the near-surface region of the slurry layer.

To come close to such a state, the slurry layer is given adequate opportunity of segregation (equivalent in this case to separation or segregation) in the method of the invention during the drying process. Within the slurry layer produced, the segregation accomplishes a division into a lower portion adjoining the coating surface, in which the coarse fraction of the $SiO_2$ particles is predominantly found, and into an outer portion adjoining the free surface of the layer, in which the fine fraction is enriched. The fine fraction of the $SiO_2$ particles is formed by nanoparticles. Nanoparticles typically consist of a composite of a few thousand $SiO_2$ molecules and normally have a specific BET surface area in the range of 50-400 $m^2/g$. In contrast to the aforementioned known method which requires a plurality of layers of different granules, a single layer application is enough in the method according to the invention; the particles of different particle sizes are here separated by pronounced, very distinct segregation, resulting in a visible casting skin, which shall be explained hereinafter in more detail.

The slurry layer is distinguished by an inhomogeneous particle size distribution, wherein the transition between lower and upper portion is not smooth, but has a visible pattern or structure in the green body under the microscope. Decisive parameters for the success of this very distinct segregation are:

The initial liquid content of the slurry—this content must be sufficiently high, namely at least 20 wt.-% to ensure an adequate mobility of the $SiO_2$ nanoparticles within the slurry layer.

Generally, a low solids content facilitates the transport of $SiO_2$ nanoparticles to the outer regions of the slurry layer, so that the solids content is not more than 80 wt.-%. On the other hand, a very low solids content can lead to high shrinkage and cracking of the green body and therefore, the minimum solids content is at least 70 wt.-%.

The way how the slurry layer is applied—this layer is not built up successively, e.g. during spraying of the slurry layer, but it is cast or sprayed on in one operation at a minimum thickness of 0.3 mm. This provides, on the one hand, a sufficiently great reservoir of $SiO_2$ nanoparticles and, on the other hand, the layer is prevented from drying too fast, which may counteract an adequate segregation and casting-skin formation. When the layer is applied by casting or spraying, the slurry is applied either as a continuous jet, i.e. without division into individual drops, or with a division pulse that is so small that a reduction of the drop diameter of the slurry below its equilibrium size is avoided; it is at least 1 mm. Therefore, the liquid content of the slurry is not significantly reduced during application of the slurry layer. The slurry layer preferably gets its end shape under the action of a tool, e.g. a doctor blade, a brush, a spraying nozzle, or a spatula. The layer surface gets slightly more liquid on account of the spreading action of the work tool, which facilitates the enrichment of $SiO_2$ nanoparticles also at a relatively low liquid content. In this connection, the spray coating shows another drawback in comparison with casting or spraying because the mechanical pulse during spraying creates suspension drops with drop diameters below the equilibrium size in the range of typically 1 µm to 500 µm, in the case of which drying inevitably starts already in the flight phase to a significant extent. The liquid content of the slurry layer formed by spraying therefore differs significantly from that of the initial slurry. The liquid loss cannot easily be compensated by increasing the initial liquid content because of the segregation tendency which is then increasing.

An amount of $SiO_2$ nanoparticles which is high enough—namely at least 2 wt.-% (on basis of the total weight of the slurry)—to achieve a significant enrichment in the outer portion of the slurry layer. In a high concentrations $SiO_2$ nanoparticles may affect a high drying shrinkage, namely a shrinkage in lateral direction (in the layer plane) and can thereby lead to delamination of the layer and to the formation of cracks. Therefore, the maximum content of $SiO_2$ nanoparticles in the slurry is 15 wt.-% (on basis of the total weight of the slurry). Since the total solids content of the slurry is between 70 and 80 wt.-%, it means that a solid content between 55 and 78 wt.-% is attributable to particles which are not $SiO_2$ nanoparticles . . . .

The way how the dispersion liquid is removed—this is done at a slow pace and in a selective manner in the direction of the free surface, so that the escaping liquid can entrain $SiO_2$ nanoparticles upwards into the outer portion.

Within the slurry layer, this produces a particularly dense and sinter-active near-surface volume portion with a relatively high amount of $SiO_2$ nanoparticles, the amount being higher than the mean amount of the $SiO_2$ nanoparticles in the dispersion layer.

The enrichment of the finer $SiO_2$ particles and especially the fine fraction on the surface of the slurry layer can be visually recognized as skin formation, which is here also called "casting skin". The slurry layer might visually appear as if coated by a wax layer.

The casting skin is also visible after drying (in the green layer). Casting skin is here the surface portion of the slurry layer that has a low porosity of less than 10% at a mean pore size of less than 1 µm. The thickness of this layer is preferably in the range of 3-15 µm, particularly preferably in the range of 5-10 µm.

Furthermore, the casting skin is distinguished in that the fine fraction of $SiO_2$ nanoparticles with particle sizes of less than 100 mm is a volume fraction of the casting skin of more than 70%, preferably a volume fraction of more than 80%.

The $SiO_2$ nanoparticles are normally not present in the casting skin in an isolated form, but are present in the form of aggregates or agglomerates that partly or fully embed the few $SiO_2$ particles of the coarse fraction. Since the porosity of the casting skin is low, the volume portion corresponds approximately to the weight portion of the $SiO_2$ nanoparticles. A volume portion of more than 70% in the casting skin is thus tantamount to an enrichment by more than 10 times in comparison with a typical initial slurry of the method according to the invention with a weight portion of 7% or less of $SiO_2$ nanoparticles.

In contrast to the spray layer which is distinguished by a substantially homogeneous distribution of the particles sizes over the layer thickness, the slurry layers applied according to the method of the invention are inhomogeneous as they show a gradient in the particle size distribution over the layer thickness, with an enrichment of $SiO_2$ nanoparticles in the near-surface portion, i.e. in the casting skin.

In ceramic process engineering, such casting skins are often regarded as a sign of an undesired inhomogeneity of the slurry layer and normally either avoided as far as possible or at least removed. In contrast to that, the instant invention provides to use this cast skin for the layer formation. Because due to said enrichment the green layer can be dense-sintered more easily than without it. This means that a lower sintering temperature and/or a shorter sintering duration are needed than in the case of a spray layer with homogeneous particle size distribution.

Already a moderate sintering (i.e. comparatively low sintering temperature and/or short sintering duration) leads to a significant densification which is adequate for most applications. A closed porosity of not more than 10% remains in the area of the former casting skin.

It has been found that a slurry layer which showed an undisturbed casting skin during drying could subsequently be sintered reproducibly and at a low temperature into a dense transparent quartz glass layer with a comparatively low surface roughness. The mean roughness $R_a$ of the sintered casting skin is normally less than 5 µm, particularly preferably less than 3 µm. This is first surprising for the reason that although $SiO_2$ nanoparticles are known to show a high sintering activity, which explains the comparatively low sintering temperature, they effect a high drying shrinkage in a high concentration, namely in lateral direction (in the layer plane) and can thereby lead to delamination of the layer and to the formation of cracks.

The fact that these effects are normally not observed in the method according to the invention can be explained by a good interlocking between casting skin and remaining green layer due to the larger $SiO_2$ particles.

The substrate consists of doped or undoped quartz glass. The quartz glass is produced synthetically or from naturally occurring raw materials. It is transparent or opaque (translucent). The coating area itself is an integral part of the substrate, or it forms itself a coating of the substrate.

Apart from the composition of the slurry layer and the way of its application to the coating surface, the removal of the dispersion liquid is a decisive parameter for the formation of the dense casting skin. In this connection a measure is preferably provided that has the effect that the slurry layer is drying at a slower pace than without the measure.

In the simplest case a slowed-down drying can be achieved in that drying is carried out in an environment with more moisture in comparison with the standard procedure or at a comparatively low temperature. The temperature of the substrate is often raised for drying, e.g. to more than 100° C.; this temperature increase can be omitted. To ensure an adequate segregation of the $SiO_2$ nanoparticles on the surface and to form a casting skin, an initial drying period of at least 2, preferably at least 3, minutes has turned out to be particularly useful.

Especially in the case of a porous coating surface a moisturizing prior to the application of the dispersion according to method step (II) is helpful to achieve a decrease in the drying rate. The previous moisturizing in this case also helps to fill open or closed pores with liquid in advance, so that their suction effect is reduced during the subsequent application of the slurry layer. The reason is that the removal of the dispersion liquid should be carried out completely, if possible, in the direction of the free surface, so that $SiO_2$ nanoparticles can be entrained by the liquid in this direction. With a suction effect due to pores, $SiO_2$ nanoparticles would be transported away in the reverse direction. That is why the possible alternative, namely an increase in the liquid amount of the dispersion for the compensation of the suction effect, is rather inefficient and might moreover lead to the instability of the dispersion due to the very high liquid content. The liquid for moisturizing the coating surface is the dispersion liquid or another liquid. The porous coating surface follows e.g. from the porosity of the component to be coated or from the porosity of a surface layer of the component.

It has also turned out to be advantageous when the slurry layer is densified mechanically.

During mechanical densification the existing gap volume between the $SiO_2$ particles is reduced and the dispersion liquid found therein is pressed out and collected on the free surface. In this process it can entrain $SiO_2$ nanoparticles and transport them towards the surface of the slurry layer. As a result, a liquid film is formed on the surface, which liquid film contains $SiO_2$ nanoparticles and easily forms a casting skin during drying. Moreover, the mechanical densification also results in a closer contact between the $SiO_2$ particles, which leads to a higher green stability of the slurry layer after drying and to a better interlocking with the substrate. The porosity remaining after the drying of the slurry layer is preferably less than 10%.

Densification can be carried out directly during application of the slurry layer. Suitable methods produce compression or shear forces in the layer, such as for instance coating or doctor blade spreading.

It has turned out to be useful when the slurry layer is produced with a layer thickness of not more than 3 mm, preferably not more than 1.5 mm and when the dispersion based on its total solids content has a weight percentage of $SiO_2$ nanoparticles of not more than 10%.

At layer thicknesses of more than 3 mm or at high weight percentages of $SiO_2$ nanoparticles of more than 10%, the risk of shrinkage cracks is increasing during drying and sintering. This can be explained by the fact that for the prevention of crack formation a certain penetration of the green layer with coarser $SiO_2$ particles is important, which particles help to interlock the casting skin, thereby counteracting tearing during drying or sintering. Therefore, the preferred thickness of the slurry layer is not significantly greater than the $D_{50}$ value of the particle size distribution in the coarse fraction of the $SiO_2$ particles.

Preferably, the coarse fraction is constituted by splintery amorphous $SiO_2$ granules with a grain size distribution having a $D_{50}$ value in the range between 3 μm and 30 μm.

The splintery $SiO_2$ granules are conducive to the integrity of the slurry layer and the interlocking with the surface and improve the adhesion thereof. The effect regarding interlocking and improved adhesion is most preferably achieved at a specific grain size distribution having a $D_{50}$ value between 3 μm and 30 μm. At a $D_{50}$ value of less than 3 μm, a significantly increased drying shrinkage of the slurry layer is observed, and granules with a $D_{50}$ value of more than 30 μm counteract a high density of solids in the slurry, which also contributes to an increased drying shrinkage. The splintery granules are produced in the simplest case by grinding, preferably by wet grinding.

The dispersion liquid preferably consists of an aqueous base.

The polar nature of the aqueous phase may have an advantageous effect on the interaction of the $SiO_2$ particles.

A solids content of the dispersion in the range between 74-78 wt.-% has turned out to be particularly advantageous.

This is a relatively low solids content, as is e.g. typical of spray slurries. Sprayability requires a low viscosity and thus a low solids content. The low solids content, however, facilitates the transportation of $SiO_2$ nanoparticles into the outer portion of the slurry layer, so that it is preferred in the method according to the invention even if the dispersion is not used as a spray slurry, but a different application technique is used, such as dispersion coating or doctor blade spreading, which would permit the use of a dispersion with higher solids contents.

After drying of the slurry layer one obtains the "green layer". Sintering or sintering of the dried green layer is carried out by heating in a furnace, or by means of a combustion flame, by means of plasma or electric arc or by means of a laser having a given operating wavelength. The green layer may contain a component which absorbs the operating wavelength of the laser or plasma radiation, so that the heat action during densification has a short duration and is locally restricted, and plastic deformations or the introduction of thermal stresses can mainly be avoided. The component which preferably absorbs the plasma or laser radiation is an additive in the form of particles of a chemical composition differing from $SiO_2$, or concerns a doping of the amorphous $SiO_2$ particles, or interfaces are concerned on which the plasma or laser radiation is diffusely reflected and is thereby absorbed.

Depending on the application, the sintered $SiO_2$ surface layer is transparent or completely or partly opaque or is at any rate distinguished by the absence of cracks and by high adhesive strength on the quartz glass of the base body. It is normally configured in the form of a flat layer, but may also have a different geometry which represents a functional component of the substrate, e.g. as a thickening or bead.

The $SiO_2$ content of the amorphous $SiO_2$ particles is preferably at least 99.99 wt.-% This is true for the splintery $SiO_2$ granules and also for spherical $SiO_2$ particles. The solids content of the slurry produced by using such $SiO_2$ particles consists of at least 99.99 wt.-% of $SiO_2$. Binders or similar additives are not intended. The content of metallic impurities is preferably less than 1 wt. ppm. This starting material does not pose any risk of contamination or crystallization. The cristobalite amount in the dried $SiO_2$ slurry layer (=green layer) should not be more than 1 wt.-% because, otherwise, crystallization may occur during sintering, which may prevent densification and lead to waste of the component.

Preferably, a dispersion is used which is free of binders.

Due to the absence of binders there is no entry of impurities into the slurry. Sintering is preferably carried out without the help of sintering aids. The layers produced thereby are distinguished by high purity. $SiO_2$ contents of more than 99.99% are achieved. Above all alkali elements that may occur either as a constituent or as impurities in the binder additives lead to the formation of the crystalline phase cristobalite at elevated temperatures. Such devitrification processes lead to the formation of cracks in case of temperature changes and they may also impede densification in the sintering process.

PREFERRED EMBODIMENTS

The invention will now be described in more detail with reference to embodiments and a drawing. In detail, FIGS. 1 to 5 show photos of green layers of different samples with the same magnification;

PRODUCING A $SIO_2$ SLURRY

In a dispersion liquid, amorphous quartz glass granules of natural raw material with grain sizes in the range between 250 μm and 650 μm are mixed into a drum mill lined with quartz glass. The quartz glass granules were previously cleaned in a hot chlorination method; attention is paid that the cristobalite content is below 1% by volume.

This mixture is ground by means of grinding balls of quartz glass on a roller block at 23 rpm for a period of 3 days to such an extent that a homogeneous slurry is formed. During grinding the pH is lowered to about 4 due to the dissolving $SiO_2$.

The $SiO_2$ granulation particles obtained after grinding the quartz glass granules are of a splintery type and have a particle size distribution which is distinguished by a $D_{50}$ value of about 8 μm and by a $D_{90}$ value of about 40 μm. $SiO_2$ nanoparticles with diameters of about 40 nm ("pyrogenic silica") is added to the homogeneous slurry. After further homogenization one obtains a binder-free $SiO_2$ slurry.

With $SiO_2$ slurries of a different, but similar composition, coating samples were produced on a different substrate and with the help of different application techniques. The composition of the respective slurry and the coating results achieved thereby are shown in Table 1:

Sample 1

Comparative Example

The $SiO_2$ slurry has a low viscosity and can per se directly be used as a spray slurry. In a first test this slurry was used for producing a coating on a porous plate. The plate consists of absorbent opaque quartz glass with an open porosity.

For coating purposes the quartz glass plate was introduced in horizontal orientation into a spray chamber and the upper side was successively provided by spraying on the slurry with a carrying $SiO_2$ slurry layer having a thickness of about 0.7 mm. To this end a spray gun was used that was continuously fed with the spray slurry.

In the subsequent partial drying process in air, a rough and rugged surface layer is formed within one minute on the thus successively applied slurry layer. This result is at any rate partly due to the fact that the slurry layer was dried because of the porous substrate so rapidly that a segregation of the fine fraction in the upper portion of the slurry layer was not possible, so that no dense and closed casting skin could be formed.

Then the further drying took place at a slow pace in that the slurry layer was allowed to stand in air for eight hours. The complete drying takes place using an IR radiator in air for 4 hours.

Figure 1:
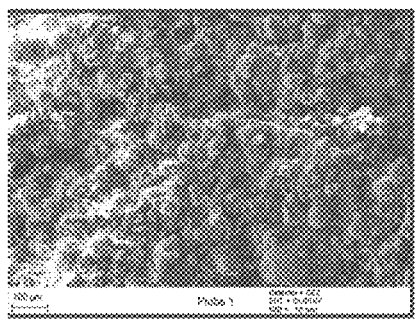

This yields a rough and cracked inhomogeneous surface layer of opaque porous quartz glass, which has the appearance shown in FIG. 1.

The dried green layer is subsequently sintered in a sintering furnace at a temperature of about 1400° C. into an opaque surface layer having a density of about 1.9 g/cm³.

Sample 2

Comparative Example

To exclude the effect of the porous substrate on the drying process, a quartz glass plate with a dense smooth surface was used in a further test instead of the porous quartz glass plate. Since the slurry layer runs off easily in this process, a slightly higher solids content than in Sample 1 was set and the final thickness of the slurry layer was here only 0.4 mm. Otherwise, the manufacturing parameters were maintained as in Sample 1.

Figure 2:
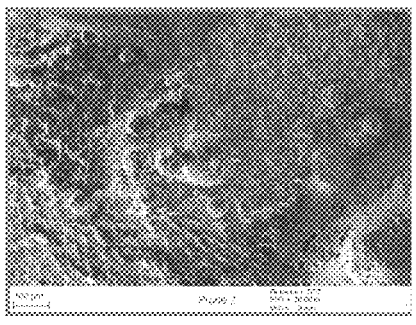

On the whole, after the slurry layer had been partially dried in air, a surface layer was obtained with an appearance as shown in FIG. 2 in a top view. It is slightly less rough and inhomogeneous than that of Sample 1. The improvement is however comparatively small.

The reason why the improvement turns out to be so small can be explained by the fact that the initial drying rate of the slurry layers in Samples 1 and 2 does not significantly differ despite the non-absorbent substrate in Sample 2. This can only be ascribed to the application technique itself. The reason is that during spraying fine drops of the slurry are produced that already lose their moisture during their flight phase. Moreover, the slurry layer is successively built up in several layers. The individual layers are thin and immediately dry in air. It is only with the thin spray slurry that it is possible to achieve a layer structure of an adequate thickness at all. As a consequence, however, there is no sufficiently large reservoir of $SiO_2$ nanoparticles for a segregation of the fine fraction on the surface of the spray layer.

The further drying and sintering takes place, as has been described above with reference to Sample 1.

Sample 3

Like in Sample 1, a $SiO_2$ surface layer with a thickness of 2 mm is to be produced on a flat plate of absorbent opaque quartz glass.

In contrast to Sample 1, the slurry layer is produced by doctor blade spreading (also called "casting on"). To this end a $SiO_2$ slurry layer with a thickness of about 4 mm is applied by doctor blade to the horizontally supported quartz glass plate and a pressure is applied directly thereafter by means of the doctor blade device to the slurry layer such that it is densified to a thickness of about 0.8 mm.

A thin liquid film is formed on the slurry layer applied and densified in this way, and a homogeneous and closed surface layer is formed during the subsequent partial drying in air. A high segregated fine fraction can be seen under the microscope. This means that within the casting skin the fraction of fine $SiO_2$ particles and particularly of $SiO_2$ nanoparticles is significantly higher than in the remainder of the slurry layer.

The way of applying the complete layer thickness in one operation provides, on the one hand, an adequately large reservoir of $SiO_2$ nanoparticles at once, which is suited for segregation on the surface, and prevents on the other hand an excessively rapid drying of the layer in air, which would otherwise counteract segregation and casting-skin formation. Therefore, despite an initially slightly lower solids content, and otherwise under similar process parameters as in Sample 1, a slower drying of about 3 to 5 min and a consolidation of the slurry layer into the carrying layer, which permits the formation of a substantially smooth casting skin, is achieved in Sample 3.

During casting the slurry layer gets its final shape under the action of a tool, such as a doctor blade, a brush, a spatula, or an outlet nozzle from which during application a continuous slurry jet exits. Due to the spreading action of the work tool the layer surface gets slightly more liquid, which facilitates the enrichment of $SiO_2$ nanoparticles also in the case of a relatively low liquid content. This result, i.e. no significant reduction of the liquid content of the slurry, can also be expected in the case of other application techniques (e.g. injection), in which the slurry layer in its total thickness is produced at once and without division into fine drops of less than 1 mm.

Figure 3:
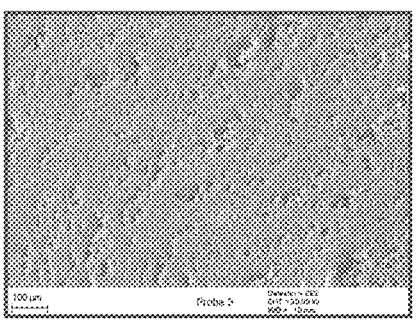

The slurry layer produced thereby is dried within 3 minutes into a carrying layer and is subsequently dried at a still slow pace in that it is allowed to stand in air for 1 hour. The casting skin thereby gets a wax-like appearance. The complete drying is carried out by using an IR radiator in air for 4 to 8 hours, whereupon it has the appearance shown in FIG. 3.

The surface seems to be substantially smooth. The smooth surface portions are formed by $SiO_2$ fine fraction, i.e. by $SiO_2$ nanoparticles and their agglomerates and aggregates. The rough surface portions are produced by $SiO_2$ coarse fraction (see also FIG. 9 in this connection). An evaluation of the surface texture by means of image analysis shows a smooth fraction of about 85% in the total surface. When looking at the surface layer in a lateral section, one can see a skin layer (casting skin) with a thickness of about 9 µm (see FIG. 9)—though with a weak structure.

The $SiO_2$ nanoparticles enriched in the surface portion of the dried slurry layer show a high sintering activity and improve the densification of the layer. During sintering of the dried green layer in a sintering furnace at a temperature of about 1400° C., the layer becomes first dense and then closed-porous. One obtains a crack-free and substantially smooth surface layer of opaque quartz glass with a density of about 2.1 g/cm$^3$ and thus a porosity of 5%.

Sample 4

A further test was carried out as described with reference to Sample 3, wherein, instead of the porous quartz glass plate as the substrate, a quartz glass plate with a dense smooth surface was used. To counteract the running off of the slurry layer, the contents of $SiO_2$ nanoparticles and solid were increased on the whole.

Figure 4:
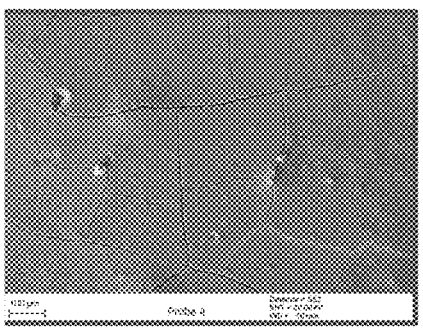

As a result, after the partial drying of the slurry layer in air a surface layer was obtained having a roughness still lower than that of Sample 3, which layer, however, contained cracks, as shown in FIG. 4. This result, which as such is surprising, can be explained in that due to the non-absorbing substrate the partial drying into the carrying layer took longer here. This leads to an enhanced enrichment of the $SiO_2$ nanoparticles in the upper region of the slurry layer, i.e. to a comparatively thick casting skin within the meaning of the invention. This effect can lead to strong drying shrinkage and thus to crack formation. When the surface layer is viewed in a lateral section one can see—though with a weak structure—a skin layer (casting skin) with a thickness of about 6 µm. Coarse-grained $SiO_2$ particles are almost completely embedded in a mass consisting of finely divided $SiO_2$, so that they do not penetrate the surface, which explains the particularly smooth surface layer of Sample 4. The evaluation of the surface texture by means of image analysis shows a smooth percentage of almost 100% on the total surface.

The crack formation shows, however, that for the achievement of an optimal result with respect to the surface quality the initial drying speed is an important parameter for the formation of an optimally thick casting skin. An initial drying duration until the achievement of a carrying layer of about 2 to not more than 5 minutes turns out to be optimal. In this respect the absorbing capacity of the substrate is a decisive parameter again.

Drying and sintering are carried out as described above with reference to Sample 3. A dense surface was obtained. This demonstrates that the cracks obtained after drying were restricted to the near-surface region, possibly to the casting skin itself.

Sample 5

In a further test, the result achieved in Sample 3 should be optimized. On a flat plate of absorbent opaque quartz glass with an open porosity, a $SiO_2$ surface layer is to be produced with a thickness of 2 mm.

In contrast to Sample 3, the quartz glass plate was first soaked for 5 minutes in an ultrasonic bath in horizontal orientation, so that the outwardly open pores were largely filled with water. The quartz glass plate is subsequently lifted in the ultrasonic bath, so that its top side projects beyond the liquid level of the bath.

With the ultrasonic vibration being switched on, a $SiO_2$ slurry layer with a thickness of about 0.8 mm is applied by doctor blade to the still horizontally positioned quartz glass plate. A pressure which is as high as possible is exerted by means of the doctor blade device, so that the slurry layer is densified to a thickness of about 0.7 mm.

Figure 5:
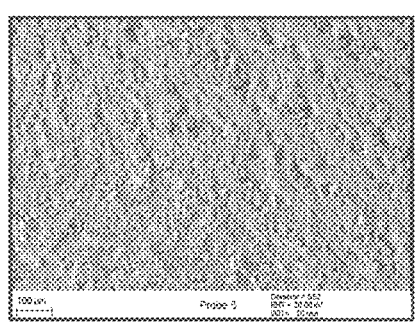

A thin liquid film is formed on the slurry layer applied and densified in this way, and a homogeneous and closed surface layer is produced during subsequent partial drying in air. The layer remains substantially smooth also after the further drying as described with reference to Sample 3, and resembles in its appearance that of Sample 3, as shown in FIG. 5. Here, the image analysis also reveals a high smooth percentage in the range of about 75% on the total surface.

In a microscopic view of the surface layer in lateral section, one can see a skin layer (casting layer)—though with a weak structure, the skin layer having a thickness of about 4 μm. Within this skin layer the fraction of $SiO_2$ nanoparticles is significantly higher than in the remaining green layer and accounts for much more than 70% of the volume of the casting skin.

The $SiO_2$ nanoparticles enriched in the surface portion of the dried slurry layer show a high sintering activity and improve the densification of the layer in the subsequent sintering process. One obtains a crack-free homogeneous layer of opaque quartz glass with a density of about 2.1 g/cm$^3$, corresponding to a porosity of 5%.

Sample 6

In a further test it was to be checked whether the result achieved with Sample 5 can also be achieved in the case of a different absorbent substrate. For this purpose a surface layer of porous $SiO_2$ with a thickness of 1.5 mm was first produced on a plate of quartz glass. The porous surface layer was produced by spraying a slurry layer thereonto and by subsequently drying the slurry layer and by sintering according to Sample 2. The volume of this surface layer and thus its suction effect for water are slightly smaller than in Sample 5.

Figure 6:
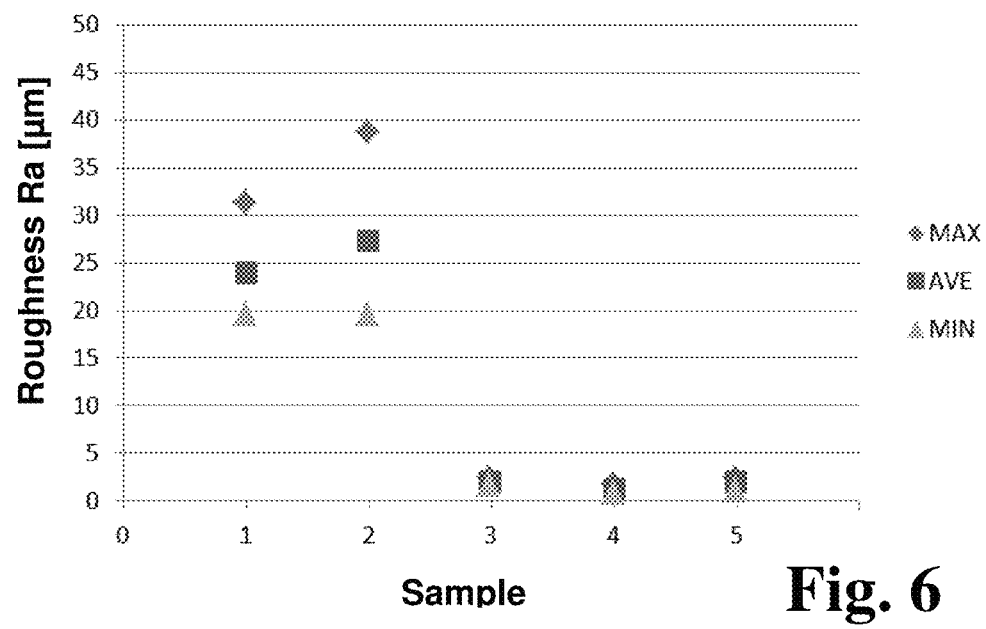
FIG. 6 is a diagram with measurement results of the mean roughness of surface layers of different samples.

A slurry layer with the slurry of Sample 5 and the process technique explained with reference to this sample was produced during drying and sintering on the surface layer pretreated in this way. A significant difference of the surface layer obtained thereby in comparison with that of Sample 5 was not detected. The diagram of FIG. 6 shows the surface roughness ($R_a$ value) of the green layer samples 1 to 5, namely maxima, minima and mean values for the Ra value (mean surface roughness), each time measured at different measurement points.

It follows that after drying the sprayed-on slurry layer shows a comparatively high mean roughness in comparison with surface layers produced by doctor blade spreading. The lowest surface roughness is achieved in Sample 4, but shows cracks. These cracks, however, have no significant impact on the $R_a$ value. A component with this surface of the sample can be used in applications where a smooth, but not a dense, surface is required. Sample no. 5 achieves the second lowest value of the surface roughness.

Figure 7:
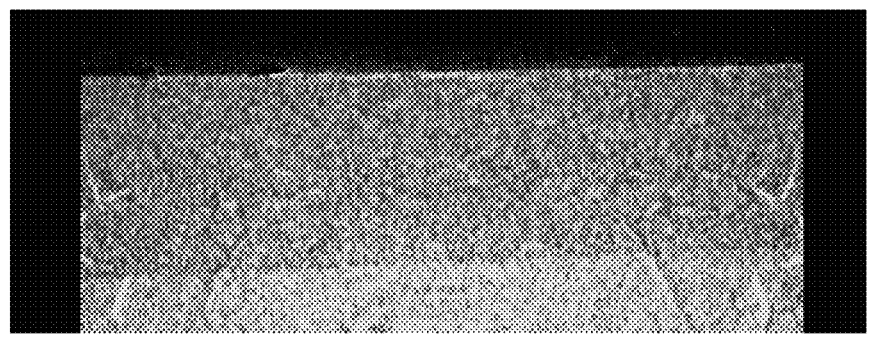
FIG. 7 is a high-resolution computed tomography scan (micro CT scan) of a green layer produced according to the method of the invention, in a side view.
Figure 8:
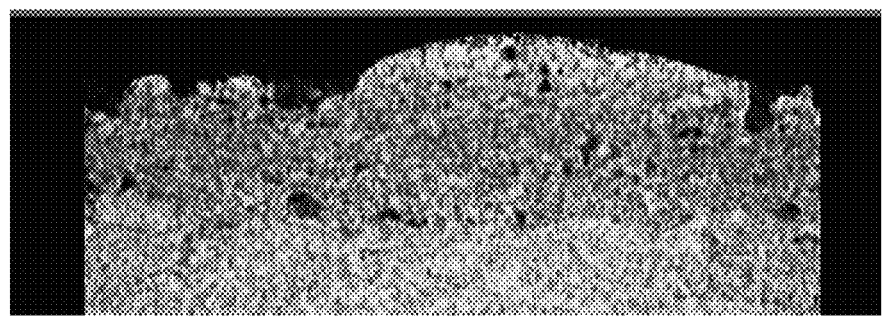
FIG. 8 is a micro CT scan of a green layer produced by spraying on and drying a slurry layer, in a side view.

The micro CT scans of FIGS. 7 and 8, each with the same magnification (about 50 times) shows cross sections of the green layers of Samples 1 and 5. Hence, Sample 1 (FIG. 8) shows a rugged and irregular surface, whereas the surface of Sample 5 (FIG. 7) is substantially smooth. At a closer look one can see that a thin portion of the surface slightly stands out, which is due to the casting skin.

Figure 9:
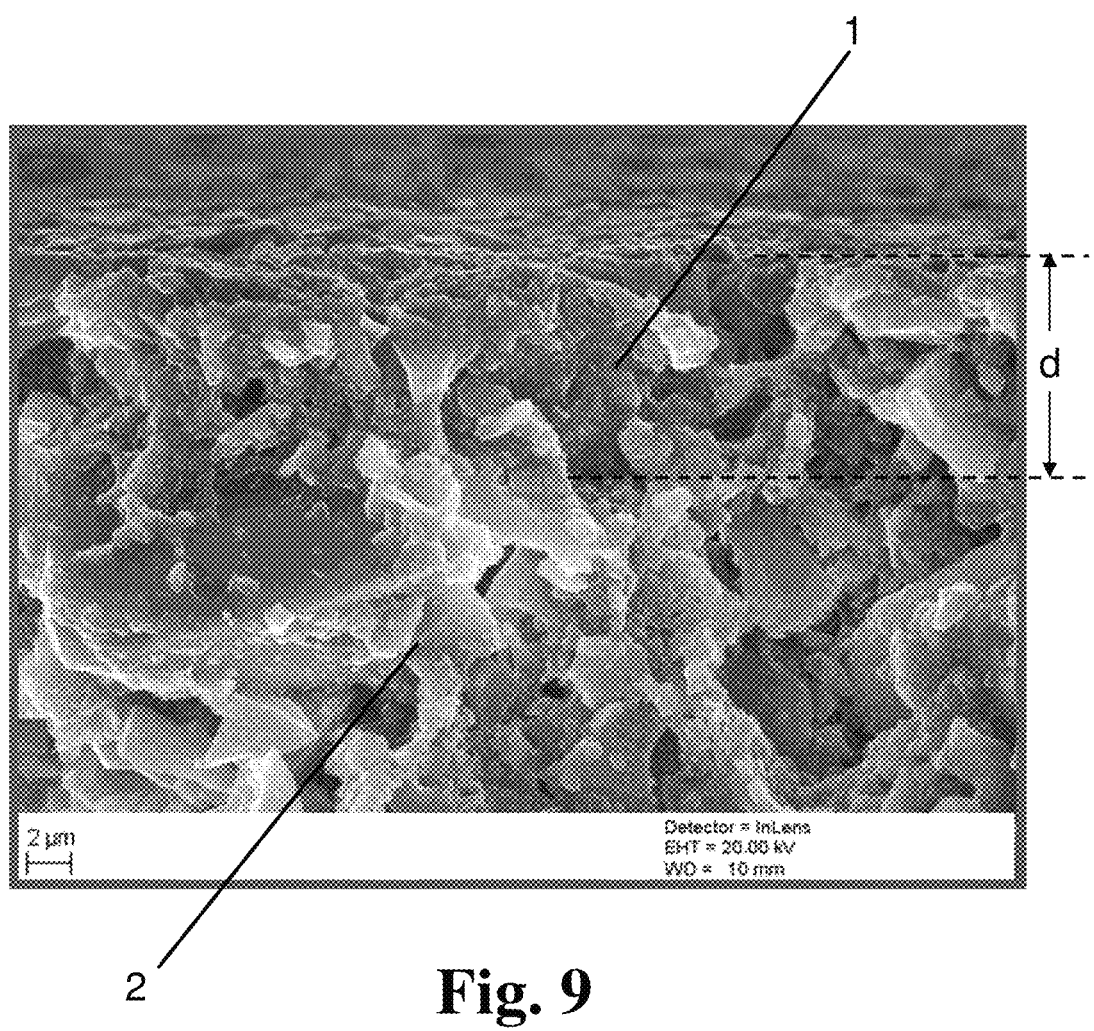
FIG. 9 is a scanning electron micrograph showing a breaking edge in a green layer according to the invention.

This surface layer can be better seen in a view on a breaking edge in Sample 5 according to FIG. 9. Here, a casting skin 1 with a particularly fine-grained structure and with a thickness d of about 9 μm clearly stands out from the rest of the layer 2 with a more coarse-grained structure. Within the casting skin 1, coarse-grained particles are almost completely embedded in a mass which consists of finely divided $SiO_2$, which is particularly formed by $SiO_2$ nanoparticles and agglomerates thereof. The volume percentage of this mass in the casting skin having a thickness of about 9 μm is more than 75%. One can also see that coarse-grained $SiO_2$ particles can hardly penetrate the surface, so that a substantially smooth and dense surface layer is obtained, as is also shown for Samples 3 and 6.

Table 1 summarizes the characteristic production parameters and the measurement results of Samples 1 to 5.

TABLE 1

| No. | Liquid | F (wt. %.) | Soot (wt. %) | Technique | Substrate | Ra [μm] | Cracks | Q |
|---|---|---|---|---|---|---|---|---|
| 1 | DI | 74 | 5 | spraying | porous/ absorbent | 24.2 | no | no |
| 2 | DI | 77 | 9 | spraying | dense/ smooth | 27.1 | no | no |
| 3 | DI | 76 | 4 | spreading by doctor blade | porous/ absorbent | 1.8 | no | yes |
| 4 | DI:ET = 70:30 | 78 | 7.5 | spreading by doctor blade | dense/ smooth | 1.2 | yes | yes only to a limited extent |
| 5 | DI:ET = 90:10 | 78 | 2.5 | spreading by doctor blade | porous/ non-absorbent | 1.6 | no | yes |
| 6 | DI:ET = 90:10 | 76 | 2.5 | spreading by doctor blade | porous/ not very absorbent | 1.8 | no | yes |

Meanings as follows:
DI: deionized water (as part of the dispersion liquid)
ET: ethanol (as part of the dispersion liquid)
F: weight percentage of the solids in the total weight of the dispersion
Soot: weight percentage of the $SiO_2$ nanoparticles in the solids content of the Dispersion
Technique: Technique for application of the slurry layer
$R_a$: mean value of the surface roughness of the surface after sintering
Q: suitable surface after sintering?

A comparison of Samples 1, 3, 5 and 6 on the one hand and of Samples 2 and 4 on the other hand shows that the roughness of the surface is substantially independent of the type of substrate; rather, the application technique is here of decisive importance. The drying duration of the slurry layer until the formation of a carrying layer, and the available segregation time, respectively, are here again of importance. The drying duration follows from the interaction of the moisture content of the dispersion, the application technique and the thickness of the slurry layer. As a rule, a long drying period results in the formation of a dense casting skin and is of advantage if a smooth surface is of importance. With very long drying periods, however, a very thick casting skin may be formed in a corresponding manner, resulting in the formation of cracks during drying, as shown by Sample 4.

The invention claimed is:

1. A method for producing a coated component consisting of transparent or opaque fused silica, the method comprising:
   (a) providing a substrate of transparent or of opaque fused silica that comprises a coating surface;
   (b) applying a single $SiO_2$ granulation layer to the coating surface, said granulation layer having an inner portion adjoining the coating surface and having a first granulation fine fraction, and an outer portion adjoining a free surface of the granulation layer and having a second granulation fine fraction, wherein the second granulation fine fraction is higher than the first granulation fine fraction;
   (c) sintering the granulation layer so as to form a dense $SiO_2$ surface layer, wherein the applying the $SiO_2$ granulation layer according to method step (b) comprises:
   (I) providing a dispersion containing a dispersion liquid and a solids content that comprises amorphous $SiO_2$ particles, said amorphous $SiO_2$ particles comprising a coarse fraction with particle sizes ranging between 1 µm and 50 µm and a fine fraction of $SiO_2$ nanoparticles having particle sizes of less than 100 nm, wherein the solids content constitutes between 70 and 80 wt.-% of the dispersion, and wherein the $SiO_2$ nanoparticles constitute between 2 wt.-% and 15 wt.-% of the dispersion;
   (II) applying the dispersion to the coating surface as a continuous stream not divided into individual drops thereonto so as to form a slurry layer having a layer thickness of at least 0.3 mm; and
   (III) drying the slurry layer by removing the dispersion liquid at a rate and in a direction such that the removing enriches the fine fraction in the outer portion of the granulation layer, and a casting skin is formed, said casting skin having a fine fraction of $SiO_2$ nanoparticles with particle sizes of less than 100 nm that constitutes a volume fraction of more than 70% thereof.

2. The method according to claim 1, wherein a measure is provided that slows the drying of the slurry layer.

3. The method according to claim 2, wherein the measure comprises moisturizing the coating surface prior to the applying of the dispersion according to method step (II).

4. The method according to claim 1, wherein the slurry layer is mechanically densified.

5. The method according to claim 4, wherein the slurry layer is densified with a treatment of the slurry layer by spreading with a doctor blade.

6. The method according to claim 1, wherein the layer thickness of the slurry layer is not more than 3 mm.

7. The method according to claim 1, wherein the $SiO_2$ nanoparticles in the dispersion constitute not more than 10% by weight of the dispersion.

8. The method according to claim 1, wherein the coarse fraction consists of splintery amorphous $SiO_2$ granules with a grain size distribution having a $D_{50}$ value between 3 µm and 30 µm.

9. The method according to claim 1, wherein the dispersion liquid consists of an aqueous base.

10. The method according to claim 1, wherein the solids content of the dispersion is in the range between 74 wt.-% and 78 wt.-%.

11. The method according to claim 1, wherein the dispersion is free of binders.

12. The method according to claim 1, wherein the casting skin has a thickness ranging from 3 µm to 15 µm.

13. The method according to claim 1, wherein the layer thickness of the slurry layer is not more than 1.5 mm.

14. The method according to claim 1, wherein the casting skin has a thickness ranging from 5 µm to 10 µm.

15. The method according to claim 1, wherein the fine fraction of $SiO_2$ nanoparticles with particle sizes of less than 100 nm accounts for a volume fraction of the casting skin of more than 80%.

* * * * *